(12) United States Patent
Heffernan et al.

(10) Patent No.: US 9,545,118 B2
(45) Date of Patent: Jan. 17, 2017

(54) POTATO CHIP CRUMB CONDIMENTS

(71) Applicants: John Heffernan, Setauket, NY (US);
Neil P Heffernan, Setauket, NY (US)

(72) Inventors: John Heffernan, Setauket, NY (US);
Neil P Heffernan, Setauket, NY (US)

( * ) Notice: Subject to any disclaimer, the term of this patent is extended or adjusted under 35 U.S.C. 154(b) by 67 days.

(21) Appl. No.: 14/575,039

(22) Filed: Dec. 18, 2014

(65) Prior Publication Data
US 2015/0173404 A1  Jun. 25, 2015

Related U.S. Application Data

(60) Provisional application No. 61/919,745, filed on Dec. 21, 2013.

(51) Int. Cl.
*A23L 3/00* (2006.01)
*A23L 1/2165* (2006.01)
*A23L 3/3589* (2006.01)
*A23L 3/3409* (2006.01)
*A23L 3/3454* (2006.01)

(52) U.S. Cl.
CPC ............ *A23L 1/2165* (2013.01); *A23L 3/3409* (2013.01); *A23L 3/3454* (2013.01); *A23L 3/3589* (2013.01); *A23L 19/15* (2016.08); *A23L 19/18* (2016.08); *A23L 27/00* (2016.08); *A23L 27/72* (2016.08); *A23P 10/30* (2016.08); *A23P 20/12* (2016.08); *A23P 20/18* (2016.08); *A23V 2002/00* (2013.01)

(58) Field of Classification Search
CPC .... A23L 3/3454; A23L 3/3589; A23L 3/3409; A23P 1/081; A23P 1/085; A23P 23/18; A23P 23/15

USPC .......... 99/534, 516, 535, 536, 494; 118/303, 118/300, 729, 732
See application file for complete search history.

(56) References Cited

U.S. PATENT DOCUMENTS

| 880,359 | A | * | 2/1908 | Collins | .................... A23L 2/80 144/208.1 |
|---|---|---|---|---|---|
| 2,379,184 | A | * | 6/1945 | Rakowsky | ................ B02B 3/00 209/172.5 |
| 3,194,664 | A | * | 7/1965 | Eytinge | .................... B02B 1/04 426/626 |
| 3,400,728 | A | * | 9/1968 | Di Gennaro | ............... B01J 2/18 118/303 |
| 3,727,542 | A | * | 4/1973 | Blanchaud | ........... A23N 15/045 99/516 |
| 5,253,578 | A | * | 10/1993 | Hsu | .......................... B01F 1/00 366/154.2 |
| 6,588,363 | B1 | * | 7/2003 | Burke | ..................... A23P 1/082 118/13 |
| 6,644,237 | B2 | * | 11/2003 | Rooke | ..................... A23P 1/083 118/19 |

* cited by examiner

*Primary Examiner* — Reginald L Alexander
(74) *Attorney, Agent, or Firm* — Alfred M Walker

(57) ABSTRACT

A shaker/dispenser dispenses crushed chip particles of discrete sizes for sprinkling directly on food as pourable condiments of discrete sized particles of the remnants of the crushed potato chips. Each potato chip of pre-determined thickness is crushed and crumbed into fine, medium and coarse crumbs of varying particle sizes. The chip crumb particles have a variety of flavors, salt and vinegar, cheese and onion, sour cream and chives, eggs and bacon, etc. The system provides selected potato chip condiments in sliced components for crushing and forming the particles of the desired sizes. In an alternate embodiment, the condiments are packaged in either a self-opening single use pouch or in a shaker/dispenser with a mill lid.

11 Claims, 4 Drawing Sheets

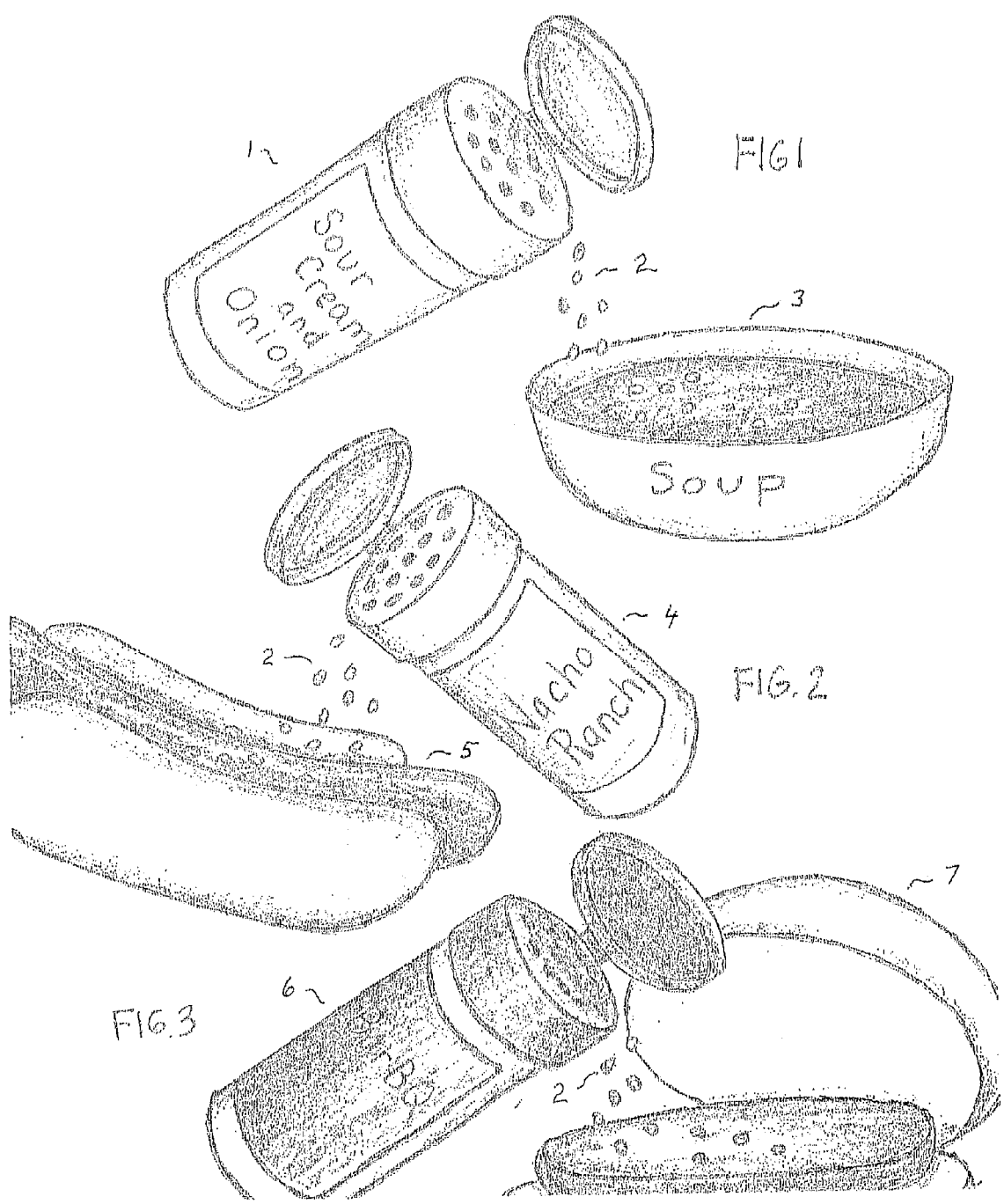

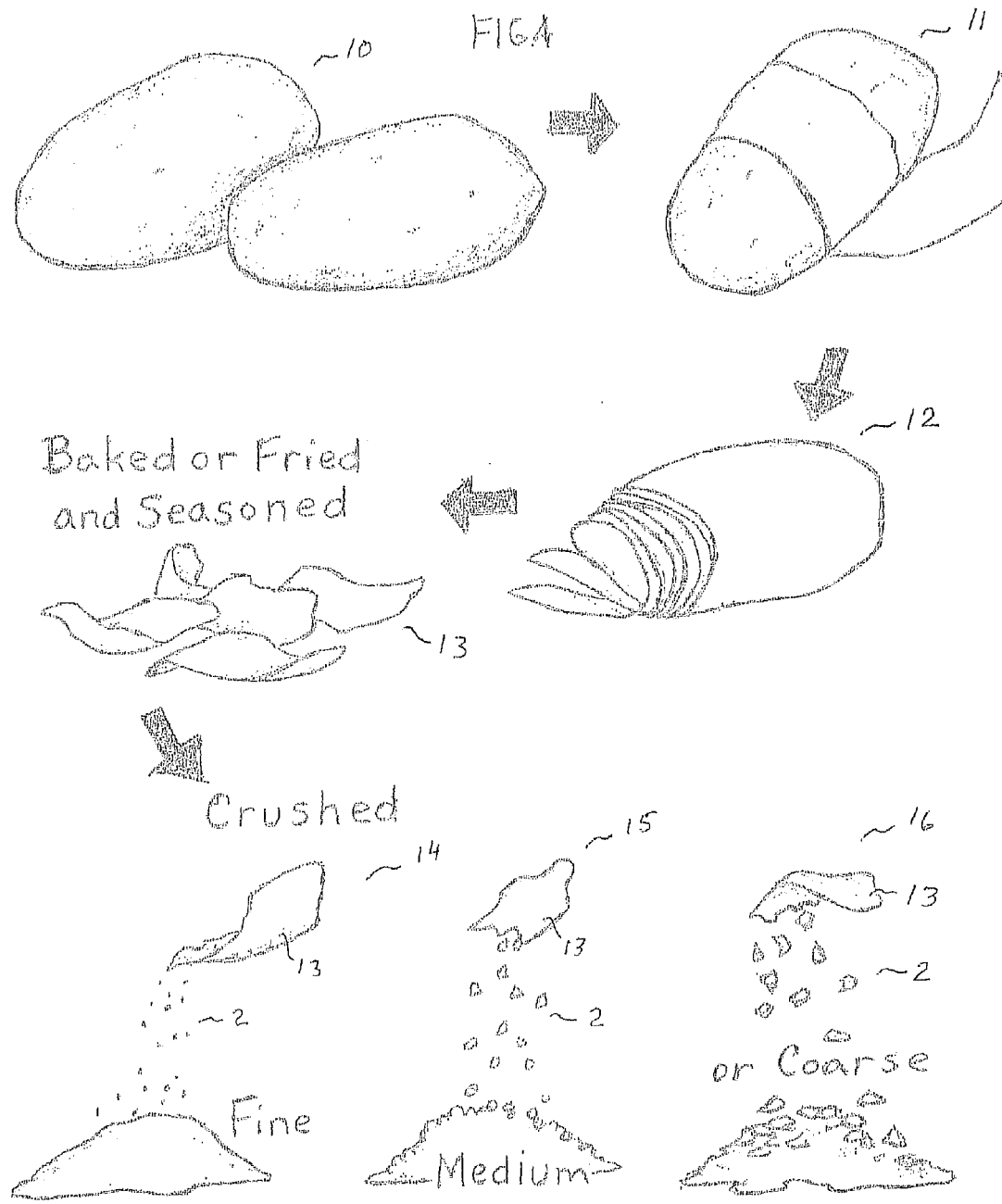

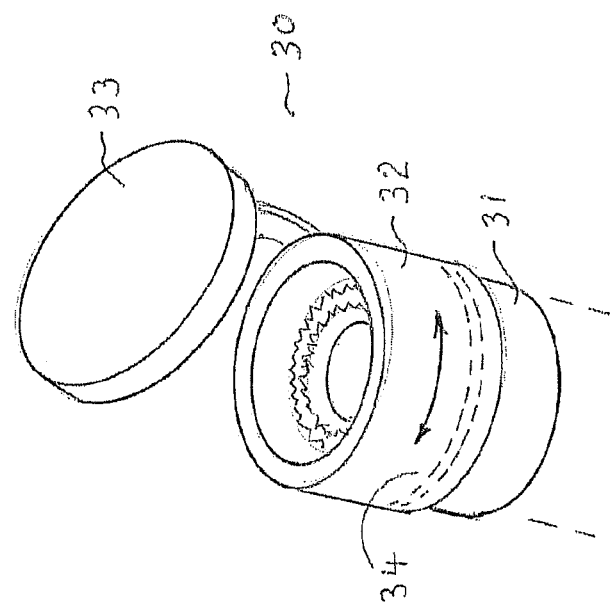
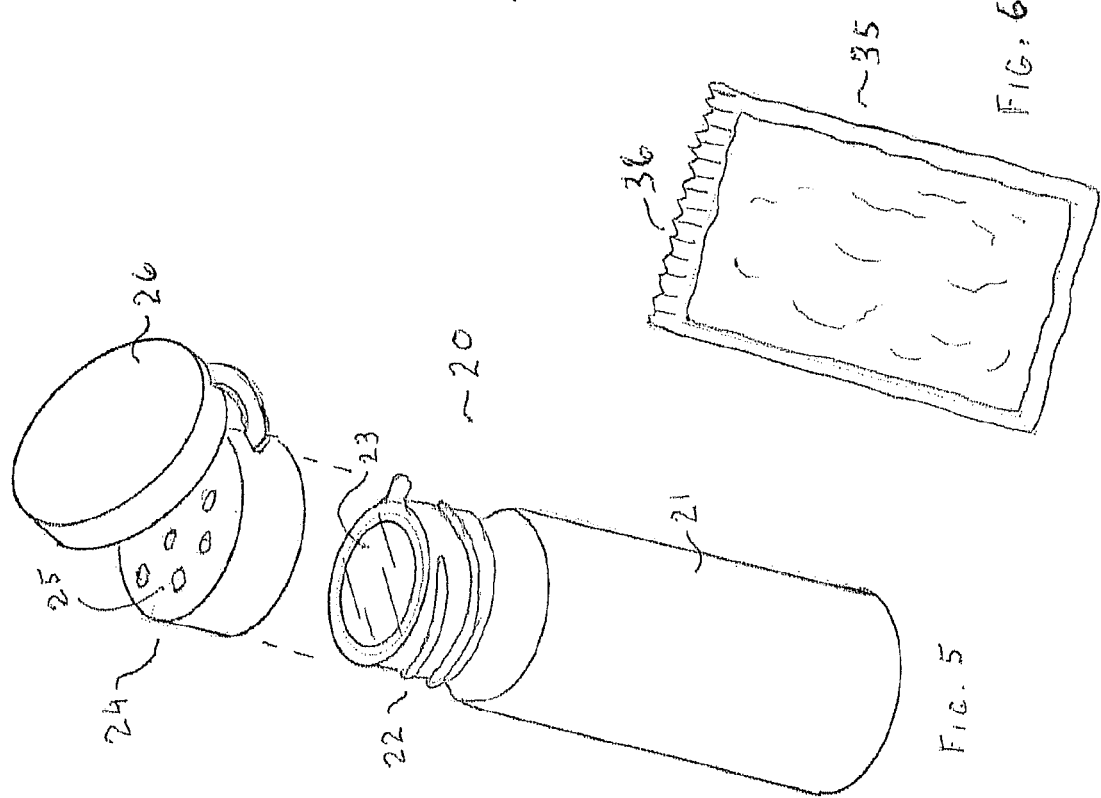

POTATO CHIP CRUMB CONDIMENTS

RELATED APPLICATIONS

This application claims the benefit of provisional application No. 61/919,745, filed Dec. 21, 2013 under 35 U.S,C, 119 (e), which '745 application is incorporated by reference herein.

FIELD OF THE INVENTION

The present invention introduces a new range of condiments made from potato snack chips. The concept of this patent application is to develop a new range of condiments based on potato snack chip flavored crumb condiments.

BACKGROUND OF THE INVENTION

Potato chips are traditionally cooked, deep fried, fried, baked, kettle fried, flavored, cooled, and packaged in airtight bags filled with nitrogen to prolong shelf life by excluding oxygen and infiltration of ambient air.

Potato chips are not to be confused with instant potato flakes, hydrogenated potato flakes, mainly used to make mashed potatoes.

Among related prior art patents include U.S. Pat. No. 6,500,474 B2 of Cross, which discloses a multi-textured food product, using crushed potato chips in a combined food base, which is textured and covered with a liquid coating and includes fat substances, such as a sour cream and onion dip forming a coating. The product has a central food core, and a solid or semi-solid fat based coating and external shell.

European Patent Application Specification number 0295320B1 of Willard describes enhancing the flavor of processed potatoes using a variety of additives in a timed heat process.

Neither prior art patent is related to the production of potato chip crumb condiments.

OBJECTS OF THE INVENTION

It is an object of the present to provide a new tasteful, organoleptic food product condiment with a variety of crushed potato chip food material as a condiment to sprinkle on food to enhance flavoring of the food products being sprinkled with the potato chip granules.

Another object of this invention is to insure a long shelf life and usage period for the potato chip condiments by using appropriate packaging.

It is also an object of the present invention to increase revenue through new business to potato growers, truckers, processes and manufacturers by increasing the consumption of potatoes.

Other objects will become apparent from the following description of the present invention.

SUMMARY OF THE INVENTION

In keeping with these objects and others which may become apparent, the present invention is a system for baking and crushing potato chips into discrete poeticized condiments for sprinkling directly on food as pourable condiment of discrete sized particles of the remnants of the crushed potato chips.

In the present invention, there are typically three varieties of chip thickness: typically 1/16 inch, 1/8 inch, and 3/16 inch thick potato chips. Each potato chip of pre-determined thickness is crushed and crumbed into fine, mediums and coarse crumbs, If one assumes a roughly cubic shape or a flat square shape to a typical particle, the size categories are defined as follows: fine condiment would be 0.5 mm to 1.5 mm on a side, while medium would be 1.5 mm to 2.5 mm, and large particles would be 2.5 mm to 3.5 mm. Extra-large particles could be provided up to 10 mm. This combination of chip thickness and crushing techniques making potentially nine distinguishable crumb types, a uniquely suitable selection is available for each condiment use.

Each variety of crumbs comes in a variety of flavors, such as salt and vinegar, cheese and onion, sour cream and chives, bacon and eggs, smoked ham, tomato and meatballs. There are many more flavors yet to be developed. The flavors are only limited by ones imagination and the processing capability.

The idea is that crumbed chips can be sprinkled on a variety of food, included as an ingredient in many prepared foods, meatloaf, meatballs, baked ziti, lasagna, for example. They may be used in their own right; to thicken soups, on and in stews, used instead of, or with, breadcrumbs, stuffing, croutons in soups, toppings of baked items, shepherd pies, meat pies, potpies, on soups, salads, pizzas, meat loaf, meatballs and tomato sauce, heroes, subways, club rolls, calzones, sandwiches, etc.

The new condiment may come in jars, with perforated lids for sprinkling the crumbs. The lids having an inner flip separated lid with a perforated hole top to allow the crumbs to be sprinkled out. The crumbs in a variety of other containers, bags, foil, boxes. Special jars or containers would have mill lids where the user could mill special sized chips to the consistency they like. This is especially useful for use in restaurants and diners.

The chip crumb has a variety of flavors, salt and vinegar, cheese and onion, sour cream and chives, eggs and bacon. The favors are limitless.

The crumbs may be sprinkled on salads, in soups, on hotdogs, hamburgers, baked ziti, lasagna, pizza, scrambled eggs, fried, poached eggs, roast beef, roast pork for any and all meals. They may be sprinkled on sandwiches, shepherd's pie, or even mashed potatoes. Other meal uses include pork chops, cold cuts, ham, roast beef, salami, turkey, roast chicken, spaghetti, meat balls, eggplant parmesan, and chicken parmesan or used to make a chip crumb sandwich. These are just some of the applications for the use of the new crumb chip condiments.

The present invention defines a new product made simply without additives from a simple product known as a potato chip. In the first embodiment, the process just describes making a potato chip by peeling, slicing, and baking or frying, followed by crushing to the desired consistency. The product is then packaged in a dispenser with a flip lid covering a perforated top. While the flip lid offers some air infiltration protection for the consumer-use period, for extended shelf life, more precaution is required to insure freshness. A bonded impermeable membrane is used to seal the open end of the container which also has an external thread adjacent to the open end. The perforated top with attached lid has a mating internal thread. The user must unscrew the lid/perforated top from the container and remove the membrane prior to use. This is familiar to users of grated cheese which is often packaged similarly.

In a second embodiment using a mill top dispenser, more attention can be paid to insuring shelf life as well as consumer-use life with fresh potato chip crumb condiments. In this embodiment, a different hybrid process is used to form the condiment. The process continuously produces two separate streams of product, one for packaging in a mill top shaker dispenser, and another for packaging in small single use packets as may be used at a take-out deli or lunch wagon. The process consists of creating baked or fried potato chips from thickly sliced potatoes. These are then crushed to large sized crumbs larger than condiment size. These large crumbs fall onto an angled horizontally vibrated separating screen which conveys the large crumbs to be packaged into the mill top dispensers while smaller crumb particles (of mixed size) fall through and are conveyed to be packaged in single-use packets. The crushing process can be adjusted to select the ratio of large crumbs to smaller crumbs to efficiently service the separate production lines.

In a further enhancement of the hybrid process, two additional steps are added. While packing the extra-large crumbs in a mill top dispenser already reduces the surface area of the stored crumb exposed to atmospheric oxygen during the consumer-use period, encapsulating the large crumbs in an inert 100-200 micron barrier layer further protects. This may be a colloidal starch mixture sprayed on using one or more ultrasonic nozzles inside a "cloud chamber" as the large crumbs are vibrated vertically on top of a vertically vibrated platform. Ultrasonic nozzles are preferred to normal misting nozzles since they form consistent small mist particles at low pressure and velocity and are also resistant to clogging. The second step is a drying process atop a heated conveyor belt.

When using a mill top, the same type of approach to extending shelf life is used as for the perforated top shaker/dispenser, namely the use of a sealing membrane. In fact the identical container can be used since the mill top has a mating internal thread. The size of the output of the mill is governed by the output gap between the stationary crushing surface and the rotating collar crushing surface, so a mill can be selected as desired for the condiment product. Another alternative is to use a mill top with a selectable gap which can be adjusted as desired for a variety of condiment crumb sizes.

BRIEF DESCRIPTION OF THE DRAWINGS

The present invention can best be understood in connection with the accompanying drawings in which:

FIG. 1 is a perspective view of an embodiment of a sour cream and onion flavored potato chip crumb condiments being sprinkled from a sieved-topped dispenser onto a bowl of soup;

FIG. 2 is a perspective view of another embodiment of a nacho ranch flavored potato chip crumb condiments being sprinkled from a sieved-topped dispenser onto a meat sandwich, such as a frankfurter hotdog encased in a split top bread roll;

FIG. 3 is a perspective view of another embodiment of a barbecued flavored potato chip crumb condiments being sprinkled from a sieved-topped dispenser onto a meat sandwich, such as a hamburger encased in a hamburger roll; and, FIG. 4 is an illustrated flow chart showing the method of producing baked, fried or seasoned potato chip crumb condiments from peeled and sliced potato chip slices, which are baked, fried and/or seasoned before being crushed by sieved-top crushing tools into various particle sized crushed potato chip crumbs of a range of particle sizes, ranging from fine, medium or coarse.

FIG. 5 is a perspective exploded view of a shaker/dispenser for potato chip crumb condiments.

FIG. 6 is a top plan view of a single-use pouch pack with rip edge for packaging potato chip crumb condiments.

FIG. 7 is a perspective view of a mill top for attachment to a container such as that used for the shaker/dispenser to dispense potato chip crumb condiments.

DETAILED DESCRIPTION OF THE DRAWINGS

Figure 8:
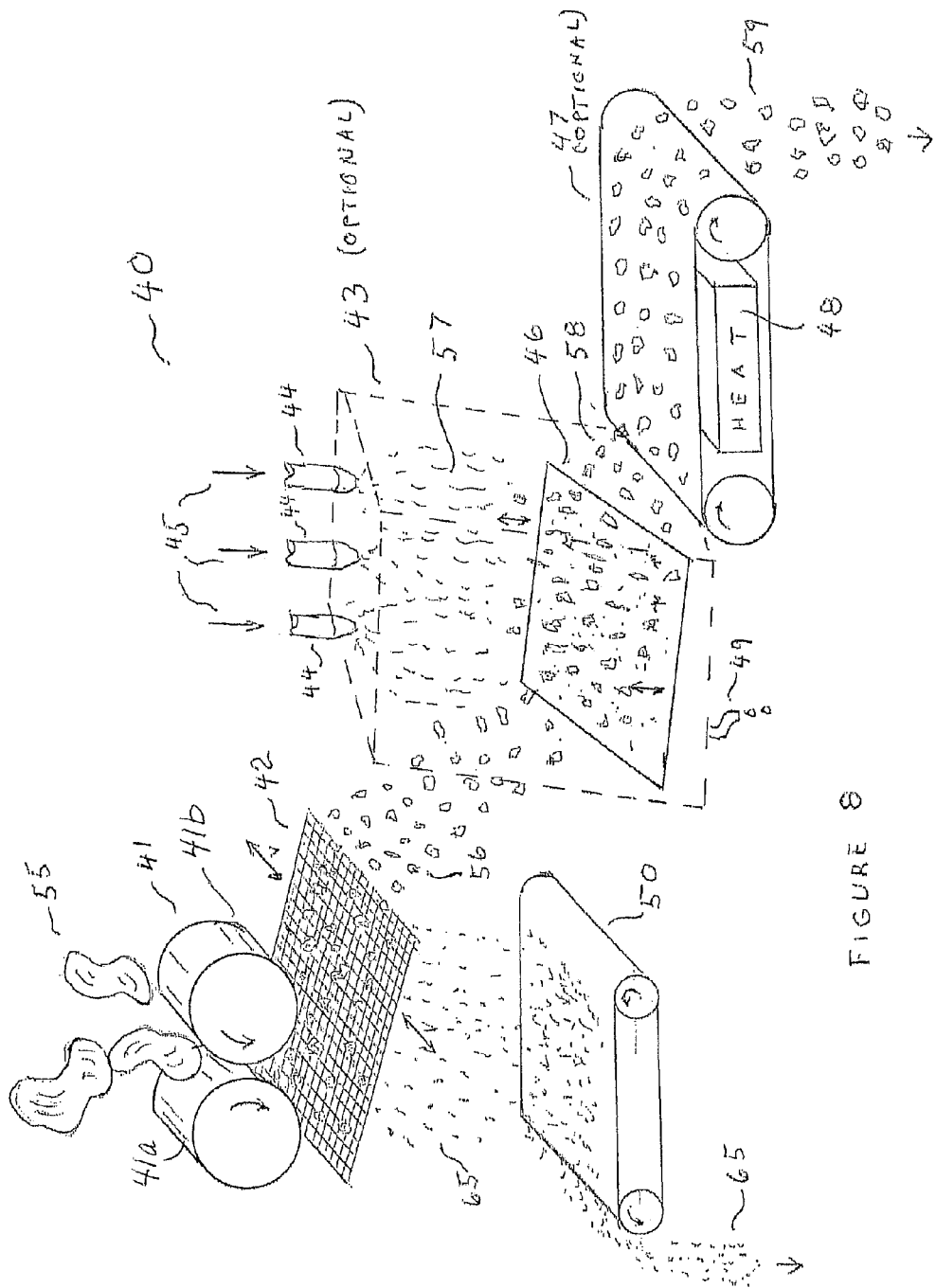
FIG. 8 is a schematic representation of a hybrid continuous process for producing two separate product streams, very large potato chip crumbs and a second stream of mixed size condiment crumb for filling single-use pouches.

As shown in FIG. 1, sour cream and onion flavored potato chip crumb condiments 2 are depicted being sprinkled from a sieved-topped dispenser 1 onto a bowl of soup 3;

In FIG. 2 there is shown another embodiment of nacho ranch flavored potato chip crumb condiments 2 being sprinkled from a sieved-topped dispenser 4 onto a meat sandwich, such as a frankfurter hotdog encased in a split top bread roll 5;

FIG. 3 depicts another embodiment of a barbecued flavored potato chip crumb condiments 2 being sprinkled from a sieved-topped dispenser 6 onto a meat sandwich, such as a hamburger encased in a hamburger roll 7.

FIG. 4 is an illustrated flow chart showing the method of processing potatoes 10 for producing baked, fried or seasoned potato chips 13 and crumb condiments 2 from peeled 11 and sliced potato chip slices 12, which are baked, fried and/or seasoned before crushed by sieved-top crushing tools into various particle sized crushed potato chip crumbs of a range of particle sizes, ranging from fine 14, medium 15 or coarse 16. If one assumes a roughly cubic shape or a flat square shape to a typical particle, the size categories are defined as follows: fine condiment would be 0.5 mm to 1.5 mm on a side, while medium would be 1.5 mm to 2.5 mm, and large particles would be 2.5 mm to 3.5 mm. Extra-large particles could be provided up to 10 mm.

FIG. 5 shows shaker/dispenser 20 for dispensing the potato chip condiment crumbs of this invention packaged in the container 21 section with external threads 22 at the top. A new dispenser is depicted with sealing membrane 23 bonded along the top edge. This must be removed by the user using extending pull tab prior to use. Perforated top 24 with perforations 25 and flip lid 26 has internal threads which mate with external threads 22 to assemble shaker/dispenser 20.

FIG. 6 shows a single-use pouch package 35 with rip top edge 36 comprising an alternative package for the crumbs of this invention. The material can be metallic foil or plastic as typically used for such snacks as peanuts or condiments such as ketchup.

FIG. 7 shows a mill top 30 with attached sealing flip lid 33. Lower extension 31 has internal threads which can mate with threads 22 of FIG. 5 to form a complete mill top dispenser with shelf life enhancing membrane 23. Movable crushing ring 32 is sealed to stationary section via O-ring 34 thereby excluding air from the container interior to extend consumer-use time before the contents go stale.

The use of a mill top dispenser permits the use of potato chip crumbs larger than desired for use as condiments (5 mm to 7 mm on a side). This in itself is advantageous since the smaller surface area per gram of condiment is reduced thereby extending consumer-use life by concomitantly reducing oxygen exposure which is key to keeping product fresh. FIG. 8 shows a continuous process 40 whereby thick potato chips are transformed into extra-large crumbs to be packaged in mill top dispensers as well as a second stream of mixed size condiment crumbs to be packaged in single-use pouches 35. Potato chips 55 are crushed via crusher 41.

The crusher 41 includes a pair of adjacent counter-rotating drums 41a, 41b, between which drums 41a, 41b the potato chips 55 are crushed into crushed potato chip condiment crumbs. They fall on tilted separating screen 42 which is continuously vibrated horizontally. The desired extra-large crumbs 56 fall off the lower edge of screen 42 and may be use at this stage to fill mill top dispensers. Smaller crumbs of a variety of useful condiment sized crumbs 65 fall through screen 42 and are conveyed via belt 50 to be packaged in pouches 35.

Two additional steps may be added to further enhance the consumer-use life period as well as shelf life of product that is packaged in mill top dispensers. This may be of interest to restaurants and diners. Without modifying the interior of extra-large crumbs 56 themselves, they are encapsulated with a 100-200 micron barrier layer of inert tasteless material such as a colloidal suspension of natural starches or perhaps a wax or cellulose barrier. An aqueous starch solution is assumed in FIG. 8. The two additional steps are the actual encapsulation and then drying of extra-large crumbs 56. The barrier layer, although not pinhole free, is effective in separating product from ambient oxygen.

A "cloud chamber" 43 is filled with a very fine mist 57 of starch solution by virtue of one or more ultrasonic nozzles 44 being fed with slightly pressurized solution at their inputs 45. Crumbs 56 enter chamber 43 and impinge a perforated tilted bottom plate 46 which is continuously vibrated vertically bouncing each extra-large crumb several times emerging encapsulated from chamber 43 and slightly moist 58. A drain outlet 49 drains any fluid build-up. Crumbs 58 exit the low edge of plate 46 and fall onto conveyor belt 47 with surface heater within to dry and hardening the coating. The extra-large encapsulated potato chip crumbs emerge 59 ready for packaging in mill top containers. Ultrasonic nozzles 44 provide a small particle mist which is excellent for encapsulating without adding much moisture. As these are milled by the consumer at use, the smell of fresh potato chips as prepared and flavored should permeate the immediate vicinity besides flavoring the food as desired.

The aforementioned drawing Figures are illustrative of the best modes thereof; and it is known that other embodiments may be implied from the description thereof.

The application is not only limited to potato chips, but can include any and all similar food and snack groups suitable for crumbing, not specifically mentioned in the text of this application.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. Apparatus for extending the shelf life as well as consumer-use freshness of crumbed potato chips comprising:
    a mist chamber having nozzles for injecting a fine mist of solution of inert tasteless solution;
    a perforated tilted bottom plate within said mist chamber;
    means for continuously vibrating vertically said bottom plate;
    a source of extra-large potato chip crumbs inserted into said mist chamber and impinging on said vibrating bottom plate whereby each of said extra-large crumbs is encapsulated by a coating of said solution; and
    a conveyer for transporting said encapsulated crumbs out of said mist chamber;
    wherein said source of extra-large potato chip crumbs comprises a horizontally vibrating separating screen through which crushed potato chips below a predetermined size pass thereby bypassing said mist chamber, said extra-large crumbs of said potato chips not passing through said screen actually entering said mist chamber.

2. The apparatus of claim 1 having means for drying said encapsulated crumbs while being transported out of said mist chamber.

3. The apparatus of claim 1 in which said solution is selected from the group consisting of a colloidal suspension of natural starches, wax and cellulose.

4. The apparatus of claim 1 wherein said extra-large potato chip crumbs are provided in a range of from 3.5 mm to 10 mm in particle size.

5. The apparatus of claim 2 in which dried crumbs now with a barrier layer for effectively separating said crumbs from ambient oxygen are packaged in mill topped dispensers.

6. The apparatus of claim 1 in which said nozzles are ultrasonic nozzles to insure a fine mist and to reduce clogging.

7. The apparatus of claim 1 in which said bypassed crumbs below a predetermined size constitute a second product stream to be packaged in single use pouches.

8. The apparatus of claim 1 in which said potato chip condiment crumbs are inserted into a hand-held shaker/dispenser.

9. The apparatus as in claim 8 wherein said hand-held shaker/dispenser dispenses the potato chip condiment crumbs from a receptacle container section with external threads at the top, said hand-held shaker/dispenser having a removable sealing membrane bonded along a top edge of said shaker/dispenser, said hand-held shaker/dispenser having a perforated top section with perforations and a flip lid, said perforated top section having internal threads which mate with external threads of said container section of said hand-held shaker/dispenser.

10. The apparatus as in claim 8 wherein said hand-held shaker/dispenser has a receptacle container section and a mill top section, said mill top section having an attached sealing flip lid and a lower extension having internal threads which mate with external threads on a top neck of said receptacle container section, to form a complete mill top shaker/dispenser with a shelf life enhancing membrane,
    said mill top section further having a movable crushing ring sealed to a stationary section via an O-ring, thereby excluding air from said shaker/dispenser's interior to extend consumer-use time before contents therein go stale.

11. The apparatus as in claim 7 in which said potato chip condiment crumbs are inserted into single-use pouches with a rip top edge.

* * * * *